(12) United States Patent
Acharya et al.

(10) Patent No.: US 6,934,799 B2
(45) Date of Patent: Aug. 23, 2005

(54) VIRTUALIZATION OF ISCSI STORAGE

(75) Inventors: Arup Acharya, Westwood, NJ (US); Khalil S. Amiri, Thornwood, NY (US)

(73) Assignee: International Business Machines Corporation, Armonk, NY (US)

(*) Notice: Subject to any disclaimer, the term of this patent is extended or adjusted under 35 U.S.C. 154(b) by 505 days.

(21) Appl. No.: 10/053,010

(22) Filed: Jan. 18, 2002

(65) Prior Publication Data

US 2003/0140193 A1 Jul. 24, 2003

(51) Int. Cl.$^7$ ................................................ G06F 12/00
(52) U.S. Cl. ........................... 711/112; 711/202; 710/3; 710/9
(58) Field of Search ................................ 711/112, 203, 711/202, 206, 164

(56) References Cited

U.S. PATENT DOCUMENTS

| | | | |
|---|---|---|---|
| 2003/0084209 A1 * | 5/2003 | Chadalapaka ................... | 710/5 |
| 2003/0093567 A1 * | 5/2003 | Lolayekar et al. .......... | 709/246 |
| 2003/0115447 A1 * | 6/2003 | Pham et al. ................. | 713/153 |
| 2003/0131182 A1 * | 7/2003 | Kumar et al. ................... | 711/5 |
| 2004/0044744 A1 * | 3/2004 | Grosner et al. ............. | 709/217 |

* cited by examiner

Primary Examiner—Mano Padmanabhan
Assistant Examiner—Paul Baker
(74) Attorney, Agent, or Firm—Louis P. Herzberg

(57) ABSTRACT

This invention describes methods, apparatus and systems for virtualization of iSCSI storage. Virtual storage isolates the clients from the management of physical storage resources. In this invention, each physical storage device supports multiple logical units (LUNs). Each supported LUN is associated with a separate TCP port number and iSCSI commands received on a given port implicitly refer to the associated LUN. An iSCSI host addresses each logical unit of storage (LUN) with a virtual IP address and port number. Using an address translation table, the virtualization gateway rewrites the destination IP address in the header of an incoming packet as well as the destination port number to correspond to the target physical LUN. Migration of logical units across physical storage devices is supported by changing the address translation entries at the gateway; and the gateway can be provided by a standard network router with support for address translation.

23 Claims, 7 Drawing Sheets

VIRTUALIZATION OF ISCSI STORAGE

FIELD OF THE INVENTION

This invention is directed to the field of IP based storage networks. It is more particularly directed to the virtual access of iSCSI (Internet Protocol—Small Computer Systems Interconnect) storage devices.

BACKGROUND OF THE INVENTION

Storage-area networks, or SANs, are gaining in popularity because they promise to curb the rising costs of storage management by enabling wider sharing of storage devices and the consolidation of storage resources under centralized administrative control. The promise of storage-area networks to simplify management relies on their ability to virtualize storage devices, separating the virtual or logical view of storage from the physical view. Storage virtualization allows administrators to deal and manage the simpler virtual view, while the storage management system handles the complexities of how that view is implemented on top of physical resources. Therefore, a high-performance and secure storage virtualization solution is crucial for such storage networks.

When storage virtualization is employed, the applications, which in this context refer to the file servers and database servers and any other application accessing block-level devices, are presented with a virtual storage space which has the required performance and availability requirements. The implementation and management of storage to provide the requisite levels of performance and availability is hidden and can change underneath the covers without application knowledge or participation.

Virtual storage provides the illusion of expandable storage space thereby isolating the clients from the management of physical storage resources, such as disks, disk arrays and tapes. While the underlying physical devices have fixed and limited capacity, a virtual storage repository can expand its capacity on a per need basis, and can improve its performance by changing the underlying physical storage devices used. Another advantage of virtualization is that it allows for load balancing to occur without host participation. When the physical blocks are be moved to balance load, but application-visible names do not have to be changed. Furthermore, storage virtualization allows for the view (namespace) of visible storage to be customized on a per-host basis and security and access control policies to be managed on a per-host basis.

The basic idea of storage virtualization is to provide a layer of indirection, mapping virtual storage blocks to physical blocks. This invention concerns storage-area networks which use iSCSI devices. iSCSI is an TCP/IP based protocol to carry SCSI commands over an IP network between hosts and storage devices. Furthermore, we suppose that the SCSI storage devices are connected via a switched SAN within a data center. SAN gateways are placed at the edge of the SAN to provide the virtual storage abstraction to applications running on the hosts. All traffic to the devices goes through one of the SAN gateways.

In such a system, a good virtualization solution should achieve the following goals:

Security and access control: Security is critical to protect storage.

High-performance: Avoiding data copies and connection management at the virtualization gateway increases bandwidth.

Manageability of storage: Security protocol upgrades, storage migration should be easy to do.

SUMMARY OF THE INVENTION

It is thus an aspect of the present invention to divide each virtual logical unit (LUN) into block ranges of fixed size, with each range mapped on to a physical LUN on a single device.

It is another aspect of the invention to export to each host a unique IP address for a given virtual LUN. The host accesses different block ranges within the virtual LUN via different TCP port numbers but via the virtual LUN's IP address.

Still another aspect of this invention is to use a gateway to perform access control and a level of virtualization by mapping virtual (IP, port#) pairs in IP packets sent by the host onto actual (IP, port#) pairs of physical storage devices.

Other aspects and a better understanding of the invention may be realized by referring to the detailed description.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Figure 1:
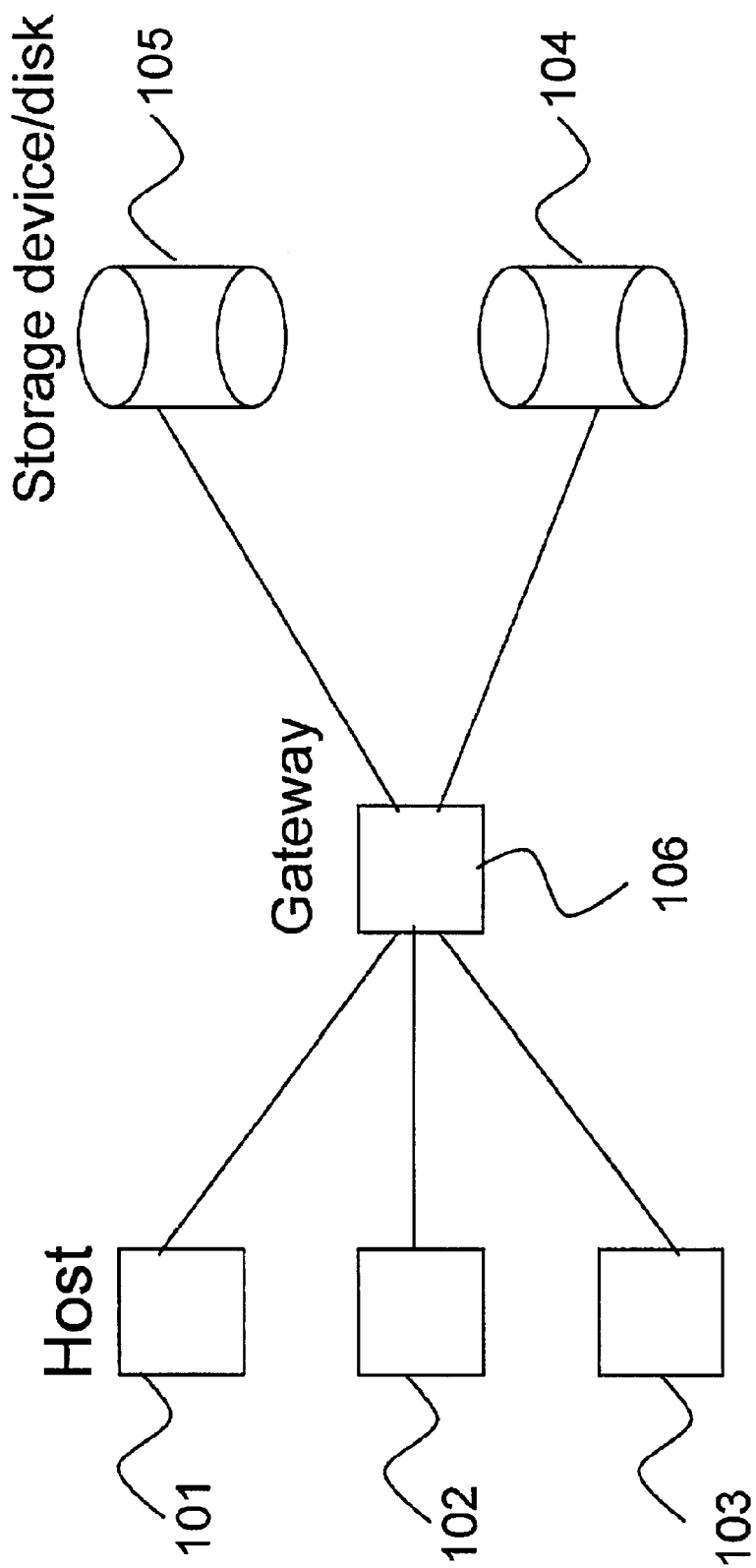
FIG. 1 describes a storage area network, in which storage devices are connected via a network to end hosts through a storage area network gateway.

FIG. 1 shows a storage area network (SAN) with virtualization gateways. A storage area network (SAN) is composed of storage devices (104, 105), gateway (106) and hosts (101,102,103). Gateways are on the edge of the SAN. Hosts talk iSCSI to the gateway. Gateways talk iSCSI to the devices. In such a system, hosts acts as clients requesting data blocks, devices as block servers. Gateways perform functions such as virtualization and access control. A SCSI (iSCSI) command addresses a logical unit number (LUN), specifies an offset and the number of blocks, to read and write including the starting block. When virtualization is used, the arguments specified by the host in the SCSI command are actually virtual. They need to be mapped to their physical counterparts. In this invention, the term LUN will be used to refer to the logical unit itself, as well as to the identifier for the logical unit, [i.e. the logical unit number] as used by those skilled in the art.

The gateways fulfill three functions, the first and primary function is routing. The gateways are commodity network switches or routers. The second function is assisting with translations (to support storage virtualization). The third function is ensuring proper access control and security at the edge of the network so that the devices do not have to implement a sophisticated authentication or security protocols. The number of gateways is expected to be smaller than the number of devices and therefore more manageable. Constraining security functions to the gateways reduces cost by limiting the nodes where secret keys are stored and where cryptographic accelerators are added, simplifies the devices and the management or update of security protocols.

A straightforward implementation of a virtualization gateway for iSCSI devices and hosts is to terminate TCP connections from the host, retrieving the SCSI command from the host packets. The gateways can then translate the virtual access to a physical access and use one or more TCP connections to the physical devices to transmit the modified physical commands, then merge and return the results to the host. This of course requires data copying, connection management and full processing through the TCP/iSCSI and SCSI stacks at the gateway. Consequently, this load limits the performance (throughput) of the gateway.

Our solution relies on limited support performed at the host and some checks and network address translations at the gateway to achieve direct access with little connection management and no data touching at the gateway. To allow the gateway to perform the routing and access checks without parsing the SCSI command inside the packet, the gateway uses the following scheme. The gateway uses the port numbers publicized to the host, and which the host uses in every subsequent packet to decode the target physical logical unit number (LUN) identifier the packet should be routed to.

The gateway publicizes tables containing metadata about each virtual LUN to the host. These tables specify a different port for each block range within the virtual LUN. Each such range is mapped onto a different physical LUN. Multiple physical LUNs may reside on the same physical device but they are associated with different ports and can be migrated to other devices independently of each other. As a result, migrations and reconfiguration will not require host notification. Only the maps used by the gateway need to be updated. When receiving a packet that is part a TCP connection to a particular block range, all the gateway has to do is steer it to the proper physical LUN by rewriting the IP and port numbers in the packet headers. The gateway then translates an incoming packet header <src address, virtual dest addr, gateway-fake port number> to <src addr, physical device IP addr, physical device port number> where the dest addr is a function of source address, virtual dest addr and dest port number. The virtualization gateway is thus provided by a regular network address translation (NAT) box.

Figure 2:
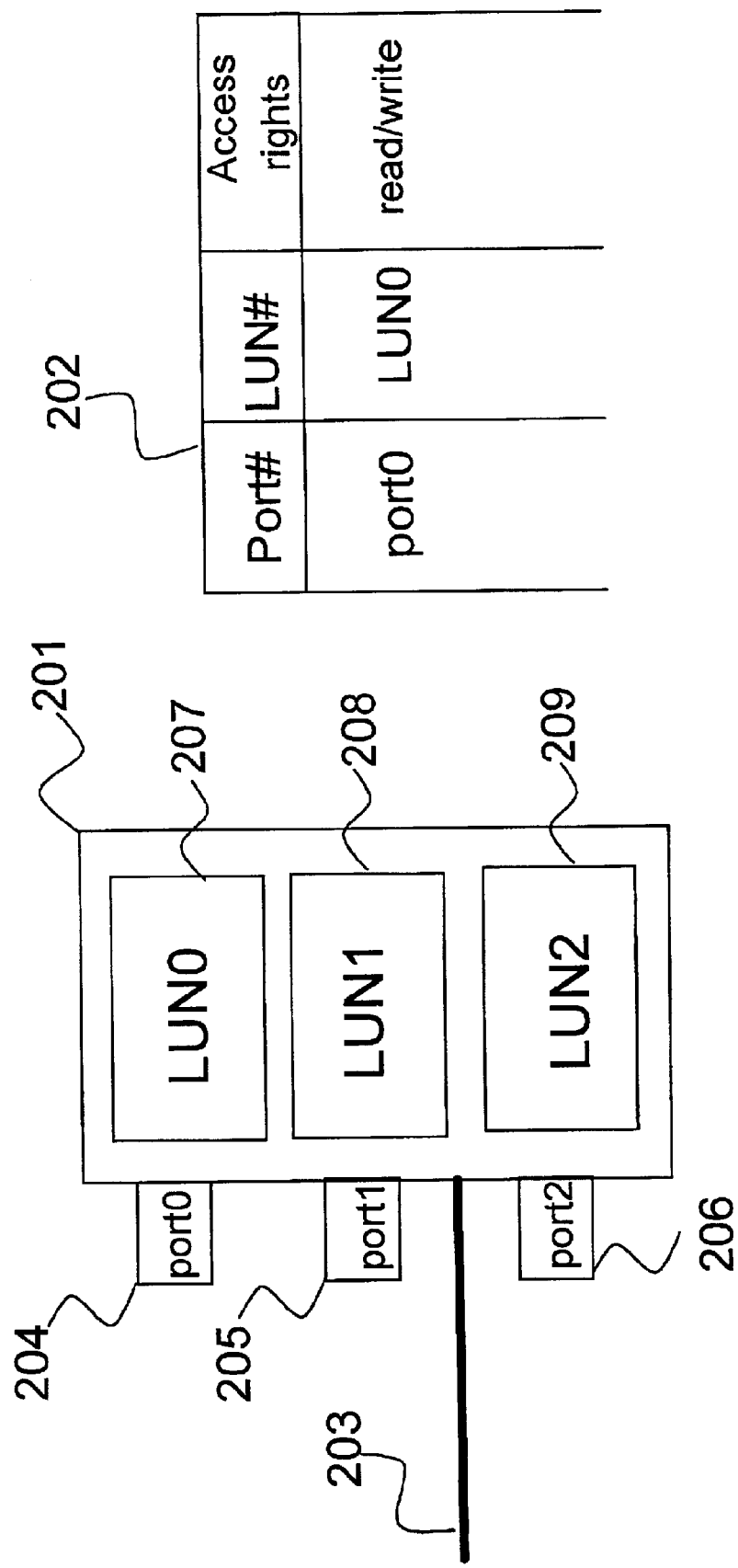
FIG. 2 represents an enhanced iSCSI storage device with multiple LUNs along with a mapping of TCP port numbers to LUNs, with each mapping associated with access rights, in accordance with the present invention.

As shown in FIG. 2, a storage device supports multiple physical LUNs with a different TCP port number associated with each physical LUN. One aspect of the invention is that all iSCSI commands received on a given TCP port of a storage device correspond implicitly to the physical LUN associated with that port, and while the offset and block numbers in the iSCSI command are significant, the LUN identifier in the command is ignored. FIG. 2 shows a storage device 201 which supports physical logical units LUN0 (207), LUN1 (208) and LUN2 (209) which received iSCSI commands on TCP port numbers port0 (204), port1 (205) and port2 (206) respectively. The storage device is connected to a virtualization gateway through a communication link 203. The table 202 stores access rights for each physical LUN.

Figure 3:
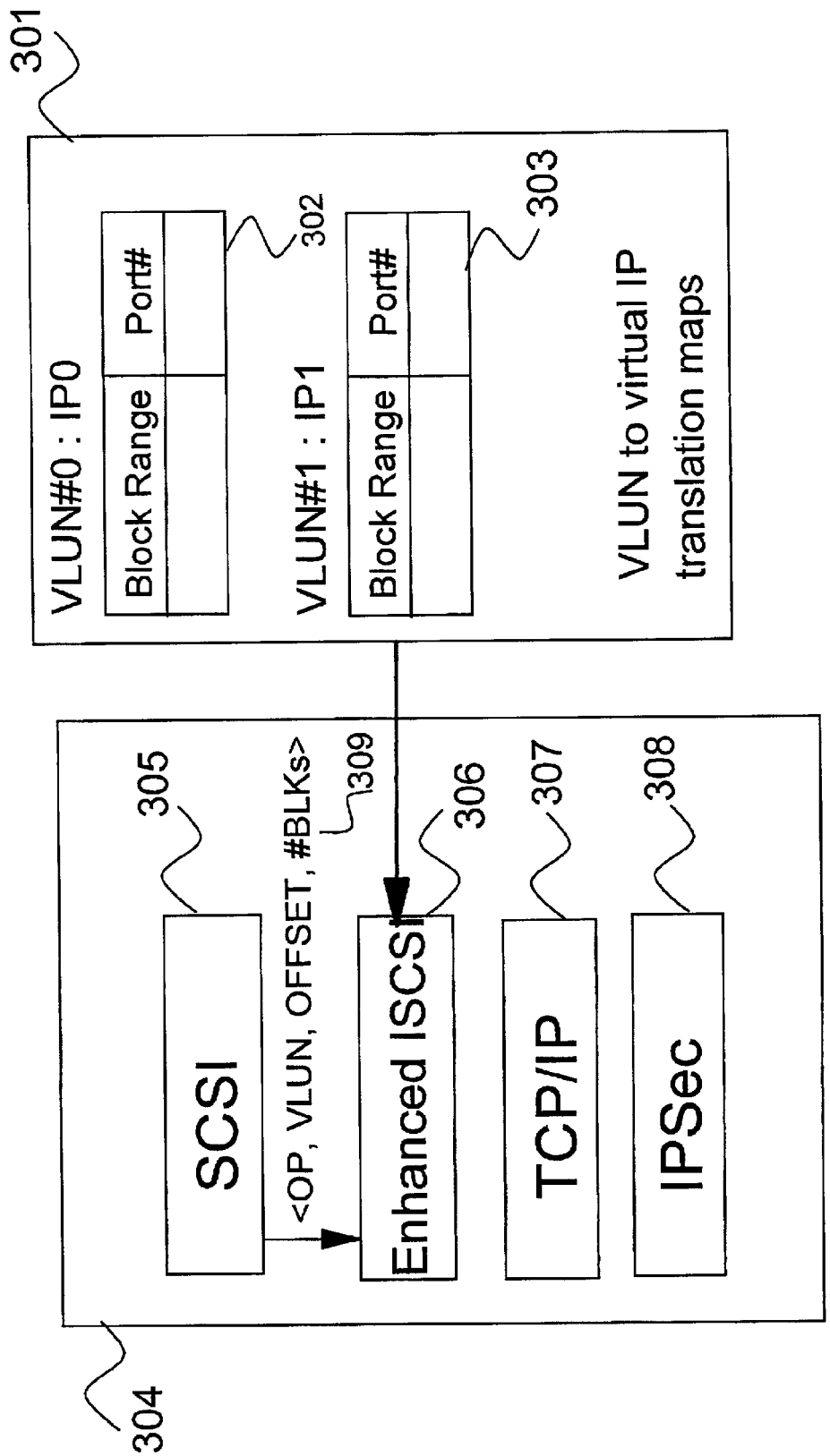
FIG. 3 shows the enhancements required at the iSCSI layer on the host, in accordance with the present invention.

FIG. 3 shows the steps performed by the host to process a SCSI command request. The host caches a table 301 which associates a single IP address for each virtual LUN, and the SCSI command parameters (LUN, Starting Block, Number of Blocks), shown as item 309 in the figure, are translated by the host to one or more iSCSI commands (Physical LUN, Remapped Starting Block, Remapped #Blocks) on one or more TCP connections, all to the same IP address, but different port numbers, with each iSCSI connection corresponding to a different TCP port number. In this figure, the table shows two entries 302 and 303, corresponding to VLUN#0 and VLUN#1, which are mapped to virtual IP addresses IP0 and IP1, respectively. Each entry maps block ranges within a VLUN to specific TCP port numbers. Commands issued by the SCSI layer 305 at the host, such as 309 in FIG. 3, are translated by the enhanced iSCSI layer 306 by looking up the appropriate entry in the table 301. The packets are then handed over to the TCP/IP layer 307 at the host, followed by an optional IPSec layer 308 which is responsible for setting up a secure tunnel with the virtualization gateway, as will be discussed in FIG. 5.

The invention requires that a device having multiple physical LUNs associate a port with each LUN. All commands received on a port are assumed implicitly to target the corresponding LUN associated with that port. Thus, Note that the commands issued by the host even when split into multiple commands for different chunks (different physical LUNs) will have the VLUN identifier in the command arguments embedded in the SCSI command within the TCP packet.

Figure 4A:
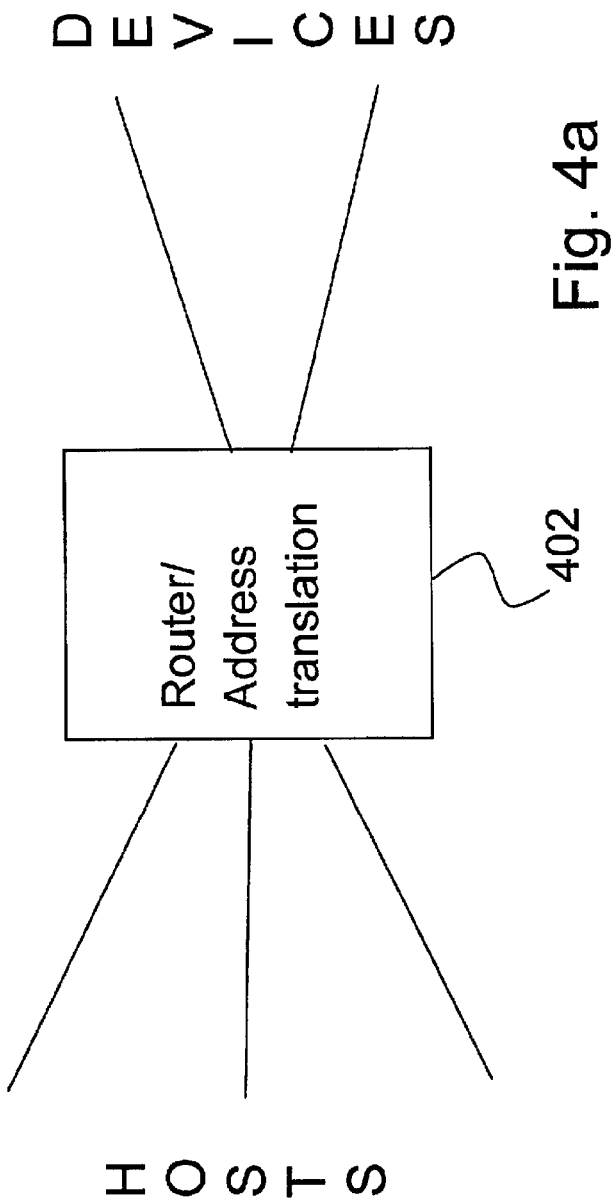
FIG. 4a shows the use of a router with address translation capability as a storage virtualization gateway, in accordance with the present invention.
Figure 4B:
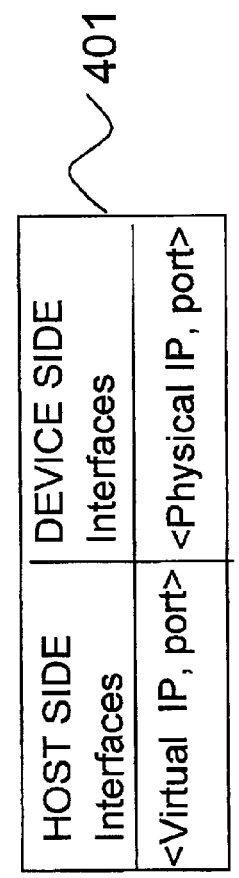
FIG. 4b shows the use of address translation tables at the storage virtualization gateway, in accordance with the present invention.

Once the host-side command rewriting is performed, outgoing SCSI commands use the correct offsets within the physical LUNs. The command is sent to the gateway, and the gateway routes the packet to the proper physical device on which the physical LUN onto which the chunk is mapped resides. As shown in FIG. 4, the gateway 402 performs an IP header rewriting of the destination IP address and port number, without touching the data or terminating TCP connections. The gateway indexes into a local table 401 to retrieve the address, port translations. If an mapping is absent, then the host was not allocated that address and the gateway drops the packet. This allows the gateway to enforce access control such that a host can access only the address space that has been exported to it. The table 401 maps <Virtual IP address, TCP port> on packets incoming from the hosts to <IP address, TCP port> corresponding to the physical LUN of the physical storage devices.

The gateway uses the standard IPSEC protocol to ensure authenticated optionally encrypted and private traffic between itself and the host. Also the gateway performs authorization checks. It verifies that a command to a target physical unit is from a host that is authorized to issue such a command. This is achieved as follows. The gateway has a map providing what physical logical units are accessible to what hosts. Upon receiving an authenticated IP packet from a host, it performs a quick lookup in a hash-table indexed by (src-ip, port#) to retrieve the rights of the host with source ip address src-ip to the physical logical unit uniquely identified with gateway-port#. If an entry exists providing the host the write to access the command, the packet is forwarded, simply translating the IP address field in the packet to the IP address of the physical device and changing the port# from gateway-port# to the recorded port number of the physical logical unit.

Through IPSec, we can support different levels of security, simple authentication, authentication plus integrity of packet (thereby ensuring command & data integrity) or full privacy (through payload encryption). Note that the devices need not have any IPSec or encryption support. Thus, they do not need to be upgraded whenever a weakness in the protocol or encryption method is detected. All security work is restricted to the much fewer gateways.

One advantage of storage virtualization is that storage managers, servers that are deployed within the SAN to move and reconfigure storage to balance load and capacity across devices, can do so without host coordination, involvement or support. Therefore, any virtualization solution must support the on-line reconfiguration of storage. The problem with storage migration tasks is that they move data blocks around and therefore the maps that translate a virtual block-id to a physical block-id must be updated to reflect the new location of a physical block that has been recently moved.

Figure 5A:
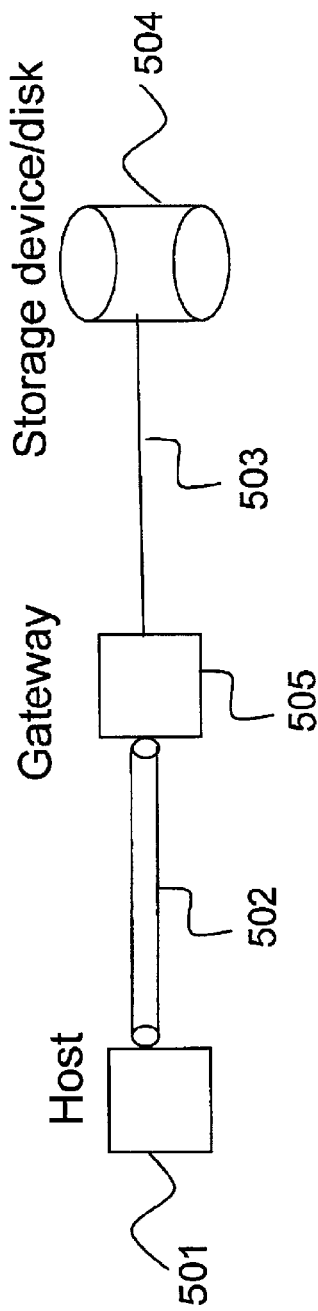
FIG. 5a shows the use of a router with address translation and IPSec processing capabilities as a secure storage virtualization gateway, in accordance with the present invention.
Figure 5B:
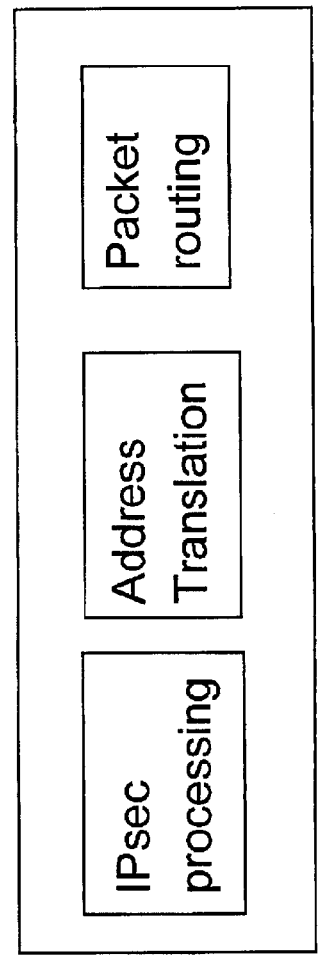
FIG. 5b shows the different packet processing capabilities supported by the secure virtualization gateway, in accordance with the present invention.

FIG. 5a shows the use of a router with address translation and IPSec processing capabilities as a secure storage virtualization gateway. It shows HOST 501 linked via 502 to GATEWAY 505. The GATEWAY 505 is coupled to STORAGE DEVICE/DISK 504 via 503. FIG. 5b shows the different packet processing capabilities supported by the secure virtualization gateway. It shows capabilities of IPsec processing, address translation and packet routing.

Figure 6:
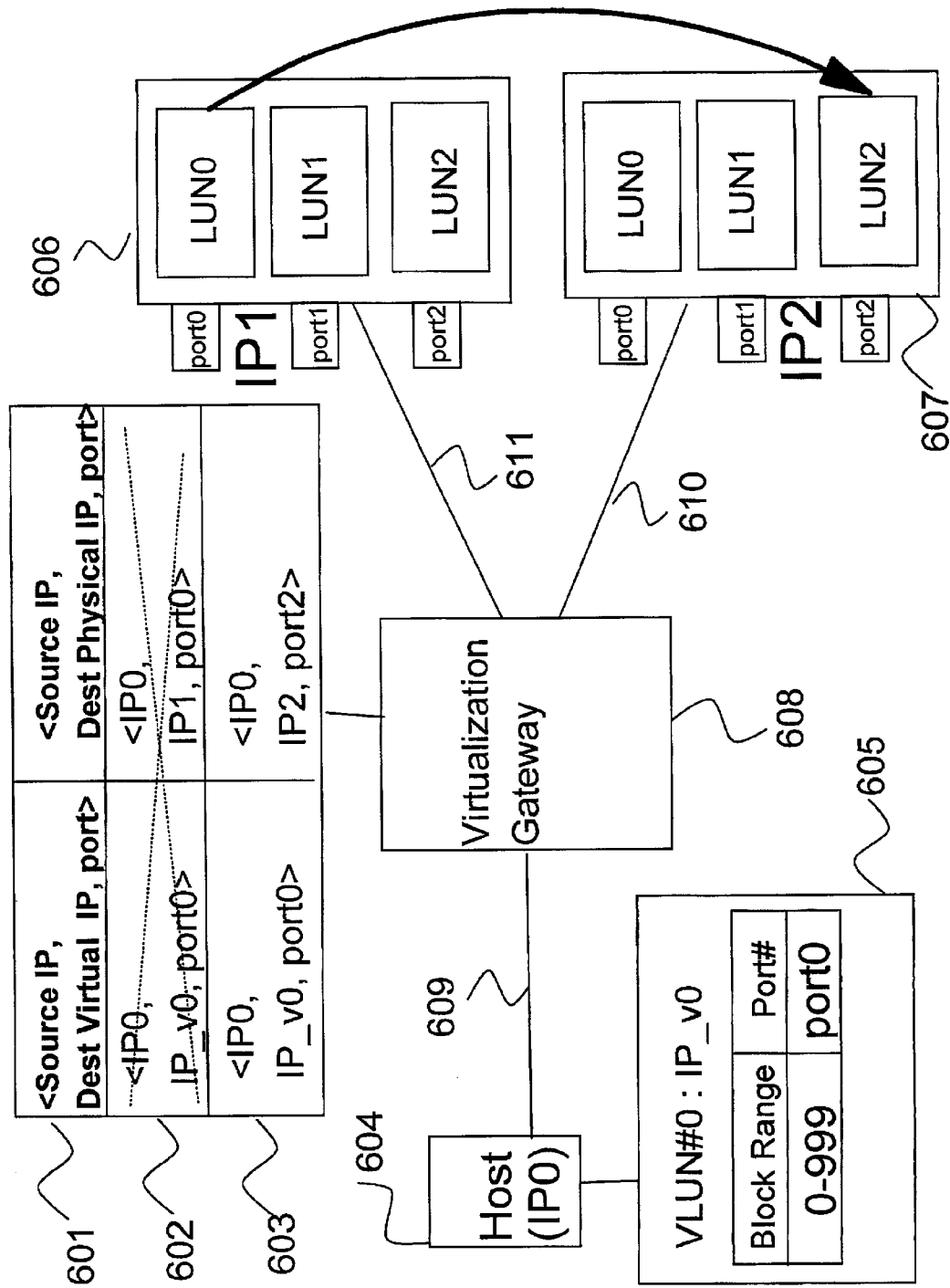
FIG. 6 shows migration of storage blocks between two physical storage devices and changes in the address translation table at the virtualization gateway such that the host remains unaffected by this migration, in accordance with the present invention, in accordance with the present invention.

FIG. 6 shows how the above storage virtualization scheme is used to migrate logical units between storage devices without requiring the host to participate in the migration process. The host 604 has a virtualization map, which maps the accesses to different blocks of VLUN#0 to different TCP port numbers on IP address IP_v0, as shown in 605. In this example, VLUN#0 is shown to contain 1000 blocks, all of which are mapped to port0. This is initially mapped to LUN0 of storage device 606 with a physical IP address IP1; commands for LUN0 are received on port0 on IP1. The virtualization gateway 608 initially translates packets from the host with source IP address IP0, according to entry 602 in its translation table 601. The virtual destination IP address, IP_v0, is replaced by IP1 and the destination port number port0 is unchanged. This is because accesses to the virtual storage device VLUN#0 by the host is mapped to the physical unit LUN0 of storage device 602 with physical address IP1.

Now, lets assume that this mapping needs to be changed and the accesses to VLUN#0 by host IP0 should be remapped to LUN2 of storage device 603 with IP address IP2; LUN2 of storage device 603 receives SCSI commands on port2. To facilitate this remapping, the entry 602 at the gateway's translation map 601 is replaced by entry 603. Consequently, the destination address IP_v0 on incoming packets at the gateway is replaced by IP2, and the destination port number port0 is replaced by port2, and TCP/IP packets containing iSCSI data/commands that were earlier being sent to LUN0 (port0) of storage device IP1 are now being sent to LUN2 (port2) of storage device 607 without changing any entry of the translation map 605 at the host 604. Since iSCSI operates over TCP connections, the host will receive a TCP reset the first time it sends a packet to the storage device 607, since it is unaware of the migration, ie remapping of its virtual storage unit VLUN#0. As a result, the TCP connection will be automatically reset, i.e the existing connection will be torn down and a new connection will be set up with the same destination address IP_v0 (as far the host is concerned). SCSI commands/data can now be exchanged over this connection between the host and the storage device 607. Physical communication links between the host and gateway, and between the gateway and the two storage devices are shown as 609, 610 and 611.

Figure 7A:
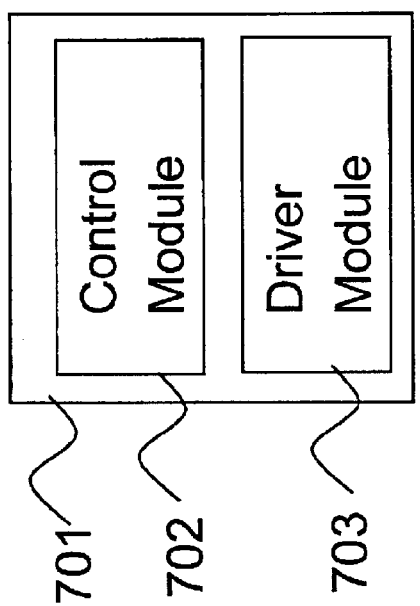
FIG. 7a shows the virtualization support modules at the host, in accordance with the present invention.
Figure 7B:
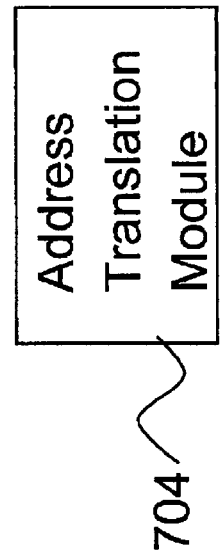
FIG. 7b shows the virtualization support modules at the gateway, in accordance with the present invention.
Figure 7C:
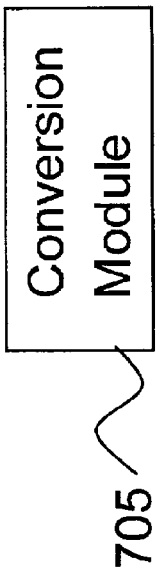
FIG. 7c shows the virtualization support modules at the storage device, in accordance with the present invention.

FIG. 7a shows the different modules implementing the invention at the host. A virtualization module (701) includes a control module (702) and a driver module (703). FIG. 7b shows the address translation module at the gateway (704), while FIG. 7c shows the conversion module (705) required at the storage device. These modules can be implemented in a manner known to those skilled in the art.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means, or computer program, in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising accessing virtual iSCSI storage, including the steps of
    defining at least one physical logical unit number (LUN) on a physical storage device having an device IP address;
    associating a unique TCP port number with each said at least one physical LUN;
    replacing a first LUN identifier specified in said iSCSI command with a second LUN identifier associated with said given TCP port number;
    establishing a unique IP address at which a virtual LUN is accessed from a host;
    identifying a block TCP port number with each block range of said virtual LUN;
    mapping a SCSI command to one or more iSCSI/TCP connections having said unique IP address and the block TCP port number identified with said each block range referenced by said SCSI command; and
    substituting said unique IP address and said block TCP port number with said device IP address and said given TCP port number on packets between said host and said storage devices,
    wherein said step of associating results in forming TCP/iSCSI connections between the host and one or more physical LUNs without terminating said TCP/iSCSI connection at an intermediate gateway between said host and said device.

2. A method as recited in claim 1, further comprising forming a correspondence between an iSCSI command received on a given TCP port with a particular physical LUN associated with said given TCP port.

3. A method as recited in claim 1, wherein the step of mapping includes converting a single SCSI command to one iSCSI connection per block range accessed.

4. A method as recited in claim 1, wherein the step of substituting includes looking up a local substitution map at a gateway having a mapping between incoming destination IP address and port number and an outgoing device IP address and port number.

5. A method as recited in claim 1, where a migration of a physical LUN from a source storage device to a target storage device requires only updating said substitution map to reflect new location of said physical LUN.

6. A method as recited in claim 1, further comprising:
    employing IPSec processing support at the host;
    employing IPSec processing support at a gateway between said host and said storage device; and forming IPSec tunnel between said host and said gateway.

7. An article of manufacture comprising a computer usable medium having computer readable program code means embodied therein for causing accessing virtual iSCSI storage, the computer readable program code means in said article of manufacture comprising computer readable program code means for causing a computer to effect the steps of claim 1.

8. A program storage device readable by machine, tangibly embodying a program of instructions executable by the machine to perform method steps for accessing virtual iSCSI storage, said method steps comprising the steps of claim 1.

9. A method comprising providing support at a physical storage device for accessing virtual iSCSI storage, including the steps of:
    defining at least one physical logical unit (LUN) on the physical storage device having an device IP address;
    associating a unique TCP port number with each said at least one physical LUN; and
    replacing a first LUN identifier specified in said iSCSI command with a second LUN identifier associated with said given TCP port number,
    wherein said step of associating results in forming TCP/iSCSI connections between the host and one or more physical LUNs without terminating said TCP/iSCSI connection at an intermediate gateway between said host and said device.

10. A method comprising providing support at a host for accessing virtual iSCSI storage, including the steps of:
    establishing a unique IP address at which a virtual LUN is accessed from the host;
    identifying a block TCP port number with each block range of said virtual LUN; and
    mapping a SCSI command to one or more iSCSI/TCP connections having said unique IP address and the block TCP port number identified with said each block range referenced by said SCSI command;
    wherein said step of establishing results in forming TCP/iSCSI connections between the host and one or more physical LUNs without terminating said TCP/iSCSI connection at an intermediate gateway between said host and said device.

11. A method comprising providing support at an intermediate gateway device between a host and a storage device for accessing virtual iSCSI storage, including the step of substituting a host-specified IP address and a host-specified TCP port number with a device IP address and a TCP port number within that device according to a substitution table describing the virtual to physical storage mapping for incoming packets before forwarding said packets,
    wherein said step of substituting results in forming TCP/iSCSI connections between the host and one or more physical LUNs without terminating said TCP/iSCSI connection at an intermediate gateway between said host and said device.

12. An apparatus comprising:
    a conversion module at a physical storage device for accessing virtual iSCSI storage, coupled to means for defining at least one physical logical unit (LUN) on the physical storage device having an device IP address; and coupled to means for associating a unique TCP port number with each said at least one physical LUN; said conversion module to replace a first LUN identifier specified in said iSCSI command with a second LUN identifier associated with said given TCP port number,
    wherein said conversion module access results in forming TCP/iSCSI connections between the host and one or more physical LUNs without terminating said TCP/ iSCSI connection at an intermediate gateway between said host and said device.

13. A computer program product comprising a computer usable medium having computer readable program code means embodied therein for causing LUN identifier substitution, the computer readable program code means in said computer program product comprising computer readable program code means for causing a computer to effect the functions of claim 12.

14. An apparatus at a physical storage device for accessing virtual iSCSI storage, comprising:
   means for replacing a first LUN identifier specified in an iSCSI command with a second LUN identifier associated with a given TCP port number included in said iSCSI command;
   means for defining at least one physical logical unit (LUN) on the physical storage device having an device IP address; and
   means for associating a unique TCP port number with each said at least one physical LUN,
   wherein access of virtual iSCSI storage results in forming TCP/iSCSI connections between the host and one or more physical LUNs without terminating said TCP/iSCSI connection at an intermediate gateway between said host and said device.

15. A computer program product comprising a computer usable medium having computer readable program code means embodied therein for causing LUN identifier substitution, the computer readable program code means in said computer program product comprising computer readable program code means for causing a computer to effect the functions of claim 14.

16. An apparatus comprising a virtualization module at a host for accessing virtual iSCSI storage, said virtualization module includes:
   means for establishing a unique IP address at which a virtual LUN is accessed from the host;
   means for identifying a block TCP port number with each block range of said virtual LUN; and
   means for mapping a SCSI command to one or more iSCSI/TCP connections having said unique IP address and the block TCP port number identified with said each block range referenced by said SCSI command,
   wherein access of virtual iSCSI storage results in forming TCP/iSCSI connections between the host and one or more physical LUNs without terminating said TCP/iSCSI connection at an intermediate gateway between said host and said device.

17. A computer program product comprising a computer usable medium having computer readable program code means embodied therein for causing SCSI command mapping, the computer readable program code means in said computer program product comprising computer readable program code means for causing a computer to effect the functions of claim 16.

18. An apparatus comprising a virtualization module at a host for accessing virtual iSCSI storage, said virtualization module includes:
   a control module establishing a unique IP address at which a virtual LUN is accessed from the host, and for identifying a block TCP port number with each block range of said virtual LUN; and
   a driver module for mapping a SCSI command to one or more iSCSI/TCP connections having said unique IP address and the block TCP port number identified with said each block range referenced by said SCSI command,
   wherein access of virtual iSCSI storage results in forming TCP/iSCSI connections between the host and one or more physical LUNs without terminating said TCP/iSCSI connection at an intermediate gateway between said host and said device.

19. A computer program product comprising a computer usable medium having computer readable program code means embodied therein for causing SCSI command mapping, the computer readable program code means in said computer program product comprising computer readable program code means for causing a computer to effect the functions of claim 18.

20. An apparatus comprising:
   an address translation module at an intermediate gateway device between a host and a storage device for accessing virtual iSCSI storage, said address translation module having a substitution table describing a virtual to physical storage mapping, said address translation module to replace a host-specified IP address and a host-specified TCP port number with a device IP address and a TCP port number within said intermediate gateway device according to the substitution table for incoming packets before forwarding said incoming packets,
   wherein access of virtual iSCSI storage results in forming TCP/iSCSI connections between the host and one or more physical LUNs without terminating said TCP/iSCSI connection at an intermediate gateway between said host and said device.

21. A computer program product comprising a computer usable medium having computer readable program code means embodied therein for causing address substitution, the computer readable program code means in said computer program product comprising computer readable program code means for causing a computer to effect the functions of claim 20.

22. An apparatus comprising:
   means for accessing, said apparatus being at an intermediate gateway device between a host and a storage device for accessing virtual iSCSI storage, said intermediate gateway device having a a substitution table, said substitution table describing a virtual to physical storage mapping of IP addresses and TCP port numbers; said apparatus comprising:
   means for replacing a host-specified IP address and a host-specified TCP port number, with an IP address and a TCP port number of the storage device, within said intermediate gateway device, according to the substitution table for incoming packets before forwarding said incoming packets,
   wherein access of virtual iSCSI storage results in forming TCP/iSCSI connections between the host and one or more physical LUNs without terminating said TCP/iSCSI connection at an intermediate gateway between said host and said device.

23. A computer program product comprising a computer usable medium having computer readable program code means embodied therein for causing address substitution, the computer readable program code means in said computer program product comprising computer readable program code means for causing a computer to effect the functions of claim 22.

* * * * *